(12) United States Patent
Del Fabro

(10) Patent No.: US 11,414,277 B2
(45) Date of Patent: Aug. 16, 2022

(54) APPARATUS AND METHOD FOR FEEDING BARS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P. MACCHINE ELETTRONICHE PIEGATRICI S.P.A., Reana del Rojale (IT)

(*) Notice: Subject to any disclaimer, the term of this patent is extended or adjusted under 35 U.S.C. 154(b) by 0 days.

(21) Appl. No.: 16/652,584

(22) PCT Filed: Oct. 2, 2018

(86) PCT No.: PCT/IT2018/050182
§ 371 (c)(1),
(2) Date: Mar. 31, 2020

(87) PCT Pub. No.: WO2019/069338
PCT Pub. Date: Apr. 11, 2019

(65) Prior Publication Data
US 2020/0239238 A1 Jul. 30, 2020

(30) Foreign Application Priority Data

Oct. 2, 2017 (IT) .................. 102017000109834

(51) Int. Cl.
*B65G 47/90* (2006.01)
(52) U.S. Cl.
CPC ................. *B65G 47/90* (2013.01)
(58) Field of Classification Search
CPC ..... B65G 47/90; B21D 43/285; B21D 43/006

USPC ....................................................... 414/745.7
See application file for complete search history.

(56) References Cited

U.S. PATENT DOCUMENTS

| 4,093,106 A * | 6/1978 | Gott ...................... B21F 23/005 221/224 |
| 4,548,537 A * | 10/1985 | Kubotera ............. B21F 23/007 414/276 |
| 4,732,066 A * | 3/1988 | Del Fabro ............ B21F 23/007 83/277 |
| 4,761,980 A * | 8/1988 | Kawashima ......... B21D 43/021 470/17 |

(Continued)

FOREIGN PATENT DOCUMENTS

| DE | 3334043 A1 | 4/1985 |
| EP | 3159072 A1 | 4/2017 |
| GB | 2194931 A | 3/1988 |

OTHER PUBLICATIONS

Int'l Search Report and Written Opinion dated Feb. 5, 2019 in Int'l Application No. PCT/IT2018/050182.

*Primary Examiner* — Lynn E Schwenning
(74) *Attorney, Agent, or Firm* — Panitch Schwarze Belisario & Nadel LLP

(57) ABSTRACT

Apparatus to bend bars, comprising: a bending unit (35) of at least one bar (B, B') and a drawing unit (46) configured to define at least a direction of feed (A) of the bar (B, B') to the bending unit (35). The bending apparatus is provided with: a support plane (11) on which the bars (B, B') to be bent are put; a removal unit (19) to remove at least one bar (B, B') from the support plane (11), a feed unit (33) configured to receive the bar (B, B') removed by the removal unit (19) and to transfer it to the drawing unit (46).

13 Claims, 4 Drawing Sheets

(56) References Cited

U.S. PATENT DOCUMENTS

| | | | | |
|---|---|---|---|---|
| 4,820,101 A * | 4/1989 | Fenn | ............... | B65G 1/0442 |
| | | | | 414/745.9 |
| 5,549,442 A * | 8/1996 | Crorey | ............. | B65G 47/907 |
| | | | | 212/203 |
| 6,763,926 B2 * | 7/2004 | Miglioranza | ....... | B21D 43/006 |
| | | | | 198/369.1 |
| 7,047,785 B2 * | 5/2006 | Peruzzo | ............. | B21D 11/12 |
| | | | | 414/751.1 |
| 7,819,621 B2 * | 10/2010 | Veit | ............... | B65G 47/1492 |
| | | | | 414/746.1 |

* cited by examiner

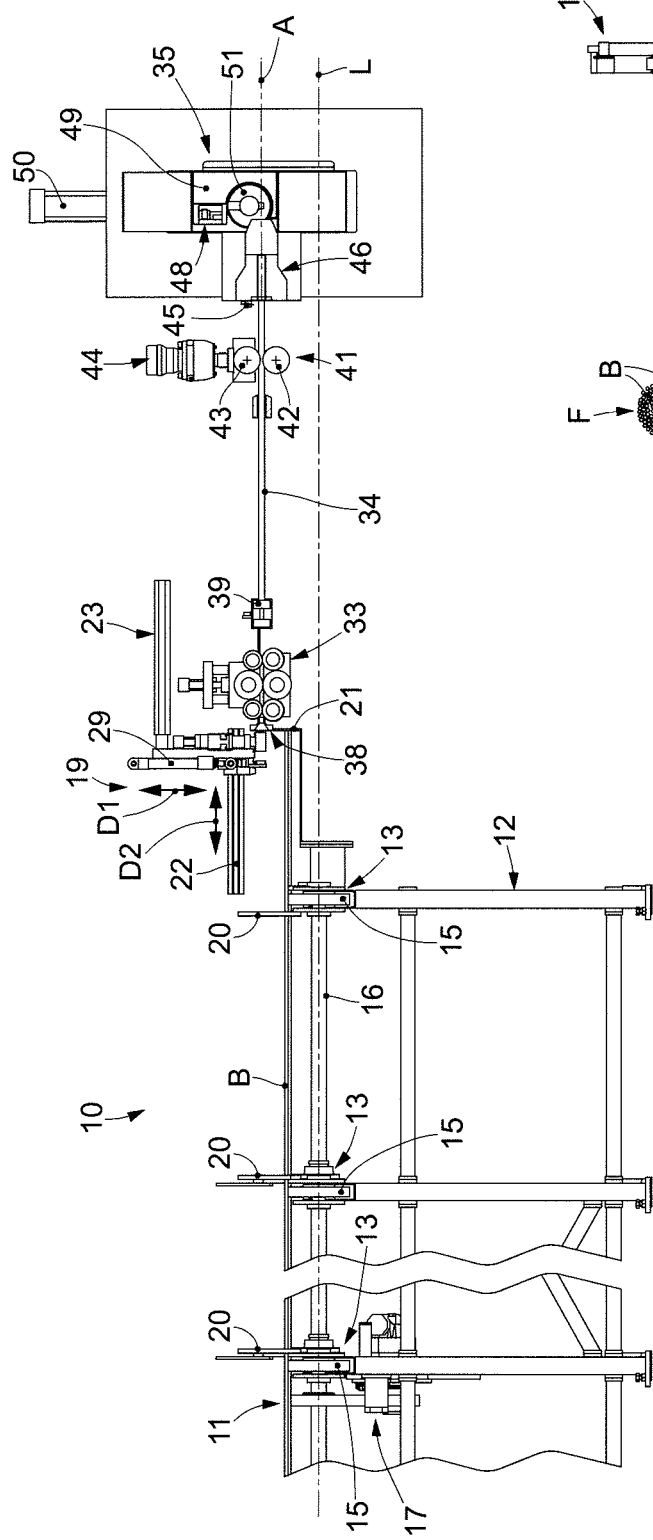
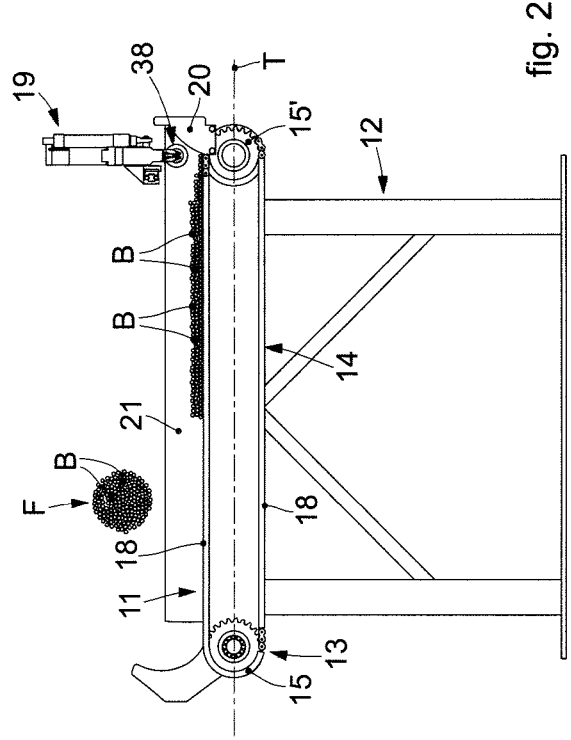
fig. 1
fig. 2

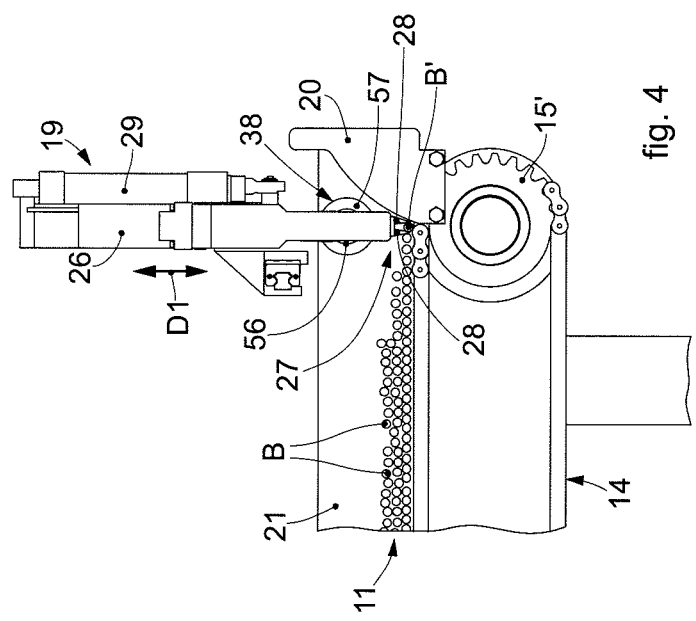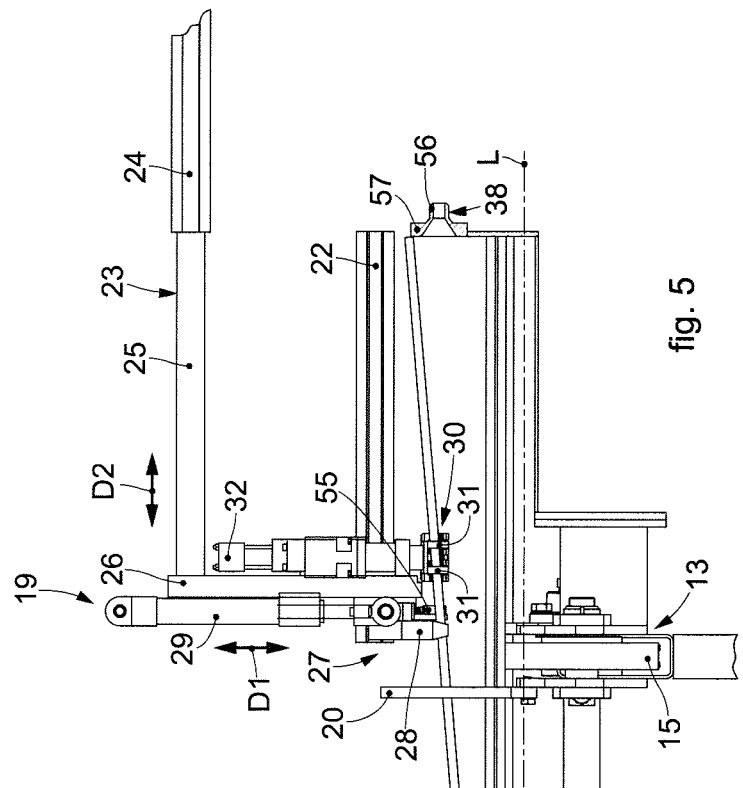

APPARATUS AND METHOD FOR FEEDING BARS

CROSS-REFERENCE TO RELATED APPLICATIONS

This application is a Section 371 of International Application No. PCT/IT2018/050182, filed Oct. 2, 2018, which was published in the English language on Apr. 11, 2019, under International Publication No. WO 2019/069338 A1, which claims priority under 35 U.S.C. § 119(b) to Italian Application No. 102017000109834, filed Oct. 2, 2017, the disclosures of each of which are incorporated by reference herein in their entirety.

FIELD OF THE INVENTION

The present invention concerns an apparatus and a method to feed bars, in particular metal bars.

By the term bars we mean generally oblong shaped products such as, for example, rod, reinforcement bars, round bars, square bars or suchlike. The bars can then be used, for example, in the construction field as reinforcements for concrete structures, for example, but not only, girders or pillars.

BACKGROUND OF THE INVENTION

Machines are known that work metal products, for example, bars, reinforcement round pieces, section bars, pipes or other profiles with any section shape, to obtain semi-finished products to be used as reinforcement in structures for the building trade.

Such machines can comprise bending machines, stirrup-making machines, cutting or counting plants, or other machines.

These machines generally require a feed apparatus able to prepare individual bars starting from bundles and to feed them sequentially, for example but not only one by one, to the respective work units, for example bending, cutting, counting units, etc.

Hereafter in the description, for simplicity, we will refer mainly to the example of a bending machine, it being understood that the considerations that will be made are valid also for the other types of machines cited above, and for others too.

A typical bending machine consists of at least one main drawing unit, for example with rollers, that feeds the metal products toward a bending unit, and at least one cutting unit, or shears, usually interposed between the main drawing unit and the bending unit, which cuts the metal products to take them to the size corresponding to the linear development of the segments to be formed.

The drawing unit therefore substantially defines a direction of feed of at least one bar to be bent toward the bending unit.

Since the bars have a certain extension, even several meters, the bar to be bent can also be introduced into a passage channel, suitably aligned with the direction of feed to the bending unit and located downstream of a bar feed unit.

The introduction and alignment operation is normally carried out manually, that is, an operator picks up the bar to be bent and places it manually in alignment with the passage channel and therefore, ultimately, with the direction of feed defined by the drawing unit.

Naturally, the fact that it is necessary to manually prepare each single bar to be bent near the feed unit, and therefore in alignment with the direction of feed to the bending unit, entails evident waste of time, problems of machine efficiency and also difficulties in the alignment operations themselves, considering the extension of each single bar.

The above considerations, as we said, are also valid for cutting plants, bar counting machines, automatic stores, etc., and in general for all those machines that require a singularized feed of the bars that reduces the manual intervention as much as possible.

There is therefore a need to provide an apparatus to feed bars in which the bar can be picked up automatically, for example from a bundle of bars scattered or singularized on a support plane, and automatically aligned with the direction of feed.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to provide an apparatus and a method to feed bars, in particular metal bars, which can overcome at least one of the disadvantages of the state of the art.

One purpose of the present invention is therefore to provide an apparatus to feed bars which is automated and allows to remove every single bar to be bent, for example from a support plane onto which a certain quantity of scattered or singularized bars is delivered, to put it automatically in line with the direction of feed of the work unit, to transfer it automatically to said work unit and then to work it effectively and accurately.

Another purpose of the present invention is therefore to obtain an apparatus to feed bars which proves extremely efficient and fast, and which eliminates or at least suitably limits the manual intervention of operators, therefore also equipped with greater safety requirements compared to known machines or apparatuses.

Another purpose of the present invention is also to provide a feed apparatus which, therefore, is able to automatically execute a removal and working sequence of bars, even until they are finished, from the support plane, this sequence being brought to an end with optimal alignment of each single bar with the direction of feed of the work unit.

Another purpose of the present invention is also to perfect a fast, efficient and automated method to feed bars.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the present invention or variants to the main inventive idea.

In accordance with the above purposes, an apparatus to feed bars according to the invention comprises:
a support plane suitable to support the bars;
a removal unit configured to remove at least one bar from the support plane;

a drawing unit configured to draw the bar in a direction of feed located distanced from the support plane;

a work unit to work the bar located downstream of the drawing unit;

a feed unit interposed between the removal unit and the drawing unit, configured to receive the bar from the removal unit and comprising at least an introduction element aligned with the direction of feed and configured to receive the bar removed by the removal unit, and to put it in line with the direction of feed.

In accordance with one aspect of the present invention, the removal unit comprises at least one gripper selectively movable at least in a first direction incident to the support plane in order to lift the bar from the support plane and put it aligned to the direction of feed, and in a second direction parallel to the direction of feed to introduce the bar into the introduction element.

In accordance with another aspect of the present invention the feed unit is configured to move the bar in the direction of feed and toward the drawing unit.

In some embodiments of the invention, the feed apparatus can also comprise at least a position detector positioned between the introduction element and the drawing unit.

Moreover, the feed apparatus can comprise at least a first position detector located upstream of the passage channel and at least a second position detector located downstream of the passage channel.

The drawing unit can comprise at least two opposite drawing rolls between which the direction of feed is defined.

The support plane of the bars can comprise at least one abutment element suitable to keep at least one of the bars positioned on the support plane aligned with the introduction element.

The support plane can comprise a containing wall suitable to head up the bars near the introduction element.

The introduction element can comprise at least one pipe for the passage of the removed bar, aligned with the direction of feed.

The pipe of the introduction element can also comprise a lead-in part suitable to facilitate the insertion of the bar removed.

The invention also concerns a method to feed bars that provides to:

position the bars on a support plane, remove at least one bar from the support plane with a removal unit, draw the bar by means of a drawing unit in a direction of feed located distanced from the support plane and work the bar using a work unit located downstream of the drawing unit.

The method provides to feed, with a feed unit interposed between the removal unit and the drawing unit, the bar received from the removal unit, introducing the bar through at least one introduction element aligned with the direction of feed.

In accordance with one implementation of the method, during the removal the method provides to move at least one gripper at least in a first direction incident to the support plane in order to take and lift the bar from the support plane and put it aligned to the direction of feed, and in a second direction parallel to the direction of feed in order to introduce the bar into the introduction element.

Moreover, the feed unit moves the bar in the direction of feed and toward the drawing unit.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the specification or in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein:

FIG. 1 is a front view of an apparatus to feed bars according to the invention;

FIG. 2 is a lateral view of a support plane of the bars of the present apparatus to feed bars;

FIG. 4 is a lateral view on an enlarged scale of a part of the support plane in correspondence with which a unit to remove at least one bar is positioned;

FIG. 5 is a front view of the removal unit in a removal step of one bar from the support plane;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 3:
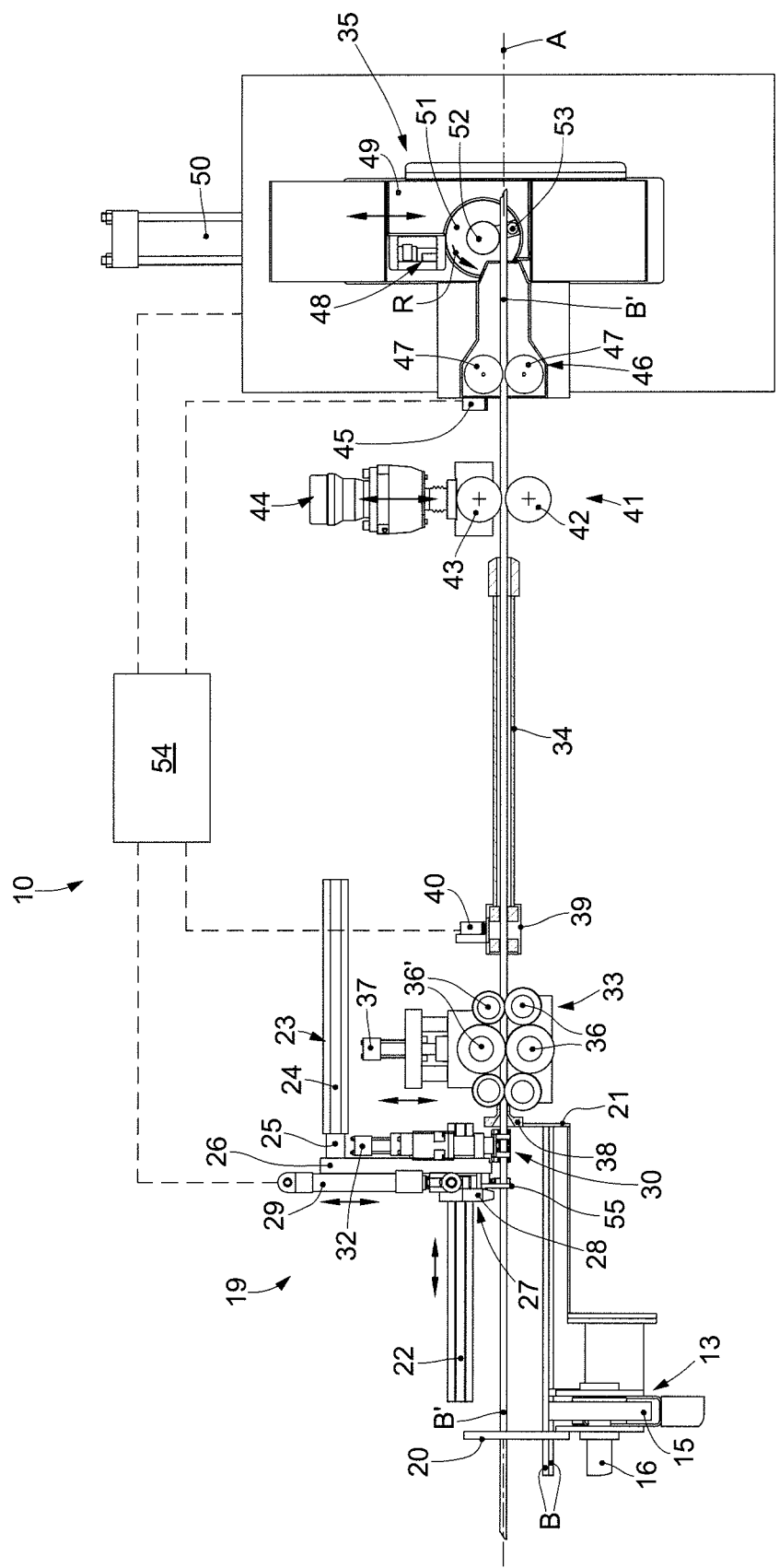
FIG. 3 is a view on an enlarged scale of part of the present apparatus to feed bars.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Hereafter in the description, in particular and for simplicity, reference will be made, by way of example, to a bending apparatus, it being understood in any case that what is described here also applies to cutting or counting apparatuses, or different machining operations to be performed on the bars fed.

With reference to the attached drawings, see for example FIG. 1 and FIG. 2, a bending apparatus 10 for bars comprises a support plane 11 on which a certain number of bars B can be disposed, even loose.

The apparatus also comprises a removal unit 19 configured to remove at least one bar B from the support plane 11, as described below.

According to another aspect of the present invention, the feed apparatus 10 comprises a drawing unit 46, located downstream of the removal unit 19 and configured to drive the bar B in a direction of feed A located at a distance from the support plane 11.

According to a possible solution, the feed apparatus 10 comprises a unit 35 for working the bar B, located downstream of the drawing unit 46.

In accordance with some embodiments, the feed apparatus 10 also comprises a feed unit 33 interposed between the removal unit 19 and the drawing unit 46, configured to receive the bar B, from the removal unit 19.

The feed unit 33 can also comprise at least one introduction element 38 aligned with the direction of feed A and configured to receive the bar B, removed by the removal unit 19, and put it in line with the direction of feed A.

Before being loaded onto the support plane 11, the bars B can be previously collected in a bundle F and transferred to the support plane 11 by means of any suitable movement and positioning mean.

The support plane 11 is supported by a frame 12 and is positioned substantially horizontally, so as to prevent the bars B from moving in an unwanted manner, due to gravity.

Movement devices 13 are associated with the support plane 11, for example chains or suchlike, configured to distribute the bars B uniformly thereon and to move them toward the removal unit 19.

The uniform distribution of the bars B on the support plane 11 can be obtained with rapid movements in alternate directions of the movement devices 13, to create a coplanar disposition of a layer of bars B on the support plane 11.

The movement devices 13 are positioned on the support plane 11 distanced from each other along the extension in length of the support plane 11, and each of them acts on a portion of the bars B to determine the movement of each of them.

In particular, the bars B, for example initially in a bundle F, can be unloaded onto the support plane 11 and, thanks to the presence of the movement devices 13, can be evenly distributed over the latter, limiting their overlapping, or to prevent reciprocal twisting which would compromise the subsequent removal of the bar B.

Each movement device 13 has an oblong development in a transverse direction T of the support plane 11. The transverse direction T is located, during use, orthogonal to the oblong development of the bars B.

Each movement device 13 comprises, in the solution shown, a transmission member 14 selectively movable in a closed ring around return members 15 and 15'.

A shaft 16 connected to a corresponding drive unit 17 is associated with at least one series of aligned return members, for example the return members 15.

The shaft 16 extends substantially in a longitudinal direction L of the support plane 11, along which the return members 15 associated therewith are also aligned.

Between the return members 15 and 15', the transmission member 14 defines return segments 18, at least one of which lies on the support plane 11 and is disposed in the transverse direction T.

In particular, it can be provided that the return segment 18 of the return members 15 and 15' has at least one support surface, facing toward the outside and lying on the support plane 11. Each return segment 18 of the transmission members 14 is located in contact with a portion of the bar B, thus terminating the distribution and movement of the bar B on the support plane 11.

The return segments 18 themselves can define the support plane 11 in correspondence with which the metal products P are supported.

The transmission member 14 can be chosen from a group comprising at least one of either a belt, a cable, a chain, for example of the roller type, or other.

The choice of a roller chain, for example, thanks to the irregularity of the support surface defined by the links that make up the chain, allows to generate vibrations on the bars B such as to induce a homogeneous distribution of the latter on the support plane 11.

In accordance with some embodiments of the present invention, the support plane 11 is provided, for example in correspondence with a longitudinal edge thereof, with at least one abutment element 20 of the bars B, in this case a plurality of abutment elements 20 configured to prevent the bars B from being unloaded from the support plane 11.

In particular, in accordance with some embodiments (FIGS. 1, 2 and 4), the at least one abutment element 20 is provided with an abutment surface which lies on an abutment plane, in this case vertical, orthogonal to the support plane 11, and incident to the transverse direction T.

According to possible solutions, the apparatus comprises a plurality of abutment elements 20 disposed aligned with each other along the abutment plane and against which the bars which are moved by the movement devices 13 are positioned in abutment.

In accordance with possible solutions, the abutment plane intercepts the removal unit 19, which with a simple vertical movement can remove the bars B which are positioned in correspondence with the at least one abutment element 20.

According to possible solutions, each abutment element 20 is located in correspondence with a terminal end of a respective movement device 13.

The support plane 11 also has a containing wall 21 protruding from the support plane 11 and transversely to its oblong development. The containing wall 21 can be positioned incident to the longitudinal direction L. For example, it can be provided that the containing wall 21 is attached to a lateral edge of the support plane 11 which is located transversely to the longitudinal edge in which the abutment elements 20 are installed.

The containing wall 21 is suitable to head up the bars B in proximity to the introduction element 38.

The containing wall 21 allows a correct positioning and alignment of the bars B which are positioned in abutment with the ends of the bars B, for example the head ends of the bars B.

According to one aspect of the present invention, the removal unit 19 comprises at least one first gripper 27 selectively movable at least in a first direction D1 incident to the support plane 11, to lift the bar B from the support plane 11 and take it aligned with the direction of feed A, and in a second direction D2 parallel to the direction of feed A and introduce the bar B into the introduction element 38.

According to one embodiment of the invention, the removal unit 19 comprises a first actuator 29 connected to the first gripper 27 and configured to move at least the latter in the first direction D1.

According to possible solutions, the removal unit 19 can be installed on guides 22 located parallel to the longitudinal direction L and is selectively translatable by means of the first actuator 29.

According to another embodiment of the invention, the removal unit 19 comprises a second gripper 30, adjacent to the first gripper 27, and configured to straighten and align the bar B removed by the first gripper 27.

According to a possible solution, the removal unit 19 comprises at least a second actuator 23 configured to translate at least the gripper 27 in a two-directional manner in the second direction D2.

Figure 6:
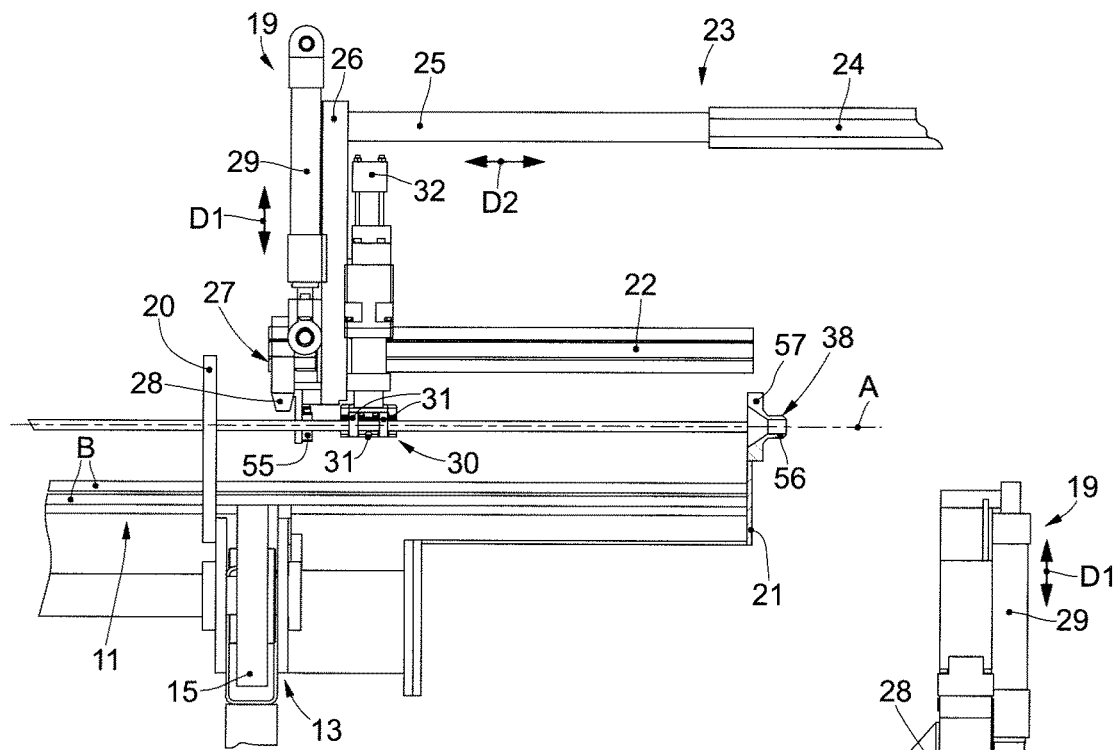
FIG. 6 is a front view of the removal unit in a straightening step of the bar removed.

According to one embodiment of the invention, the removal unit 19, see also FIGS. 3 and 6, is installed along guides 22 and the second actuator 23 allows to move the removal unit 19 in the second direction D2. The second actuator 23 can comprise a cylinder 24 and a stem 25, mobile inside the cylinder 24 and connectable to a body 26 of the removal unit 19.

Figure 7:
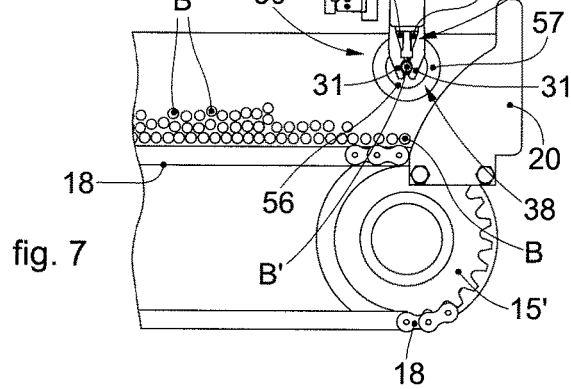
FIG. 7 is a lateral view of the removal unit in an introduction step of the removed and straightened bar into an introduction element.

The first gripper 27 is provided with a pair of jaws 28 suitable to remove at least one bar B', see FIG. 7 for example.

The second gripper 30 is also provided with jaws 31 suitable to clamp and, as will be better understood with the description of the functioning of the present apparatus, to align or straighten at least one bar, for example the bar B'.

The second gripper 30 can also be provided with an actuator 32 which regulates the opening and closing of the jaws 31.

Between the first gripper 27 and the second gripper 30 an abutment element 55 is positioned, suitable, as described hereafter, to position the bar B removed by the first gripper 27 of the removal unit 19 in proximity to the second gripper 30.

Downstream of the removal unit 19 and upstream of the drawing unit 46, the feed unit 33 is installed, suitable to move a single bar, for example the bar B', from the support plane 11 toward, for example, the working unit 35 located downstream and aligned with the direction of feed A.

In accordance with a possible solution of the invention, the apparatus comprises a passage channel 34 interposed between the feed unit 33 and the drawing unit 46 and aligned with the introduction element 38 and with the direction of feed A.

The feed unit 33 comprises at least one pair of opposite rollers, in this case two series of opposite rollers 36 and 36' between which the bar B' slides. At least one of the rollers 36 or 36' is motorized to define a feed of the bar B' in the direction of feed. The rollers 36 and 36' define a passage gap between them, which is disposed substantially aligned with the direction of feed A and through which the bar passes during use.

The feed unit 33 also comprises an actuator 37 suitable to vary the reciprocal distance between the two series of rollers 36 and 36', to vary the pressure that they are able to exert on the bar. For example, it can be assumed that the series of first rollers 36 is fixed and that the series of second rollers 36' is associated with the actuator 37, so as to be moved closer to or farther from the series of first rollers 36.

The introduction element 38 is aligned with the direction of feed A of the bending unit 35 and is therefore suitable to automatically align at least one bar removed, for example bar B', with the direction of feed A. The introduction element 38 can be located upstream of the rollers 36 and 36' and is configured to define an introduction guide for the bar B' into the passage gap defined by the rollers 36 and 36' themselves.

In accordance with possible solutions of the present invention, the abutment plane, defined by the at least one abutment element 20, intercepts the introduction element 38. In this way the bars B which are moved by the movement devices 13 are positioned in abutment against the at least one abutment element 20 and are already in a position suitable for removal and subsequent insertion into the introduction element 38.

According to other embodiments of the present invention, the introduction element 38 is positioned on a parallel and distanced plane, for example upward, with respect to the lying plane of the support plane 11.

In this way, the removal unit 19 can insert the bar B into the introduction element 38 substantially with a simple vertical movement of the bar B itself, and a subsequent translation in the direction of feed A.

The introduction element 38 can be, for example, in the form of a pipe 56, for example with a circular section and having a suitable extension.

The introduction element 38, moreover, upstream of the pipe 56, can comprise a lead-in part 57, for example with a truncated cone shape, to facilitate insertion of the bar B.

The introduction element 38 is therefore aligned in the direction of feed A of the bending unit 35, along which the passage channel 34 is also aligned.

The passage channel 34 comprises an entrance zone 39 of a bar B. At least one first position detector 40 is positioned in correspondence with the entrance zone 39, for example a laser device, an encoder or suchlike. The function of the first position detector 40 is to detect the passage of the bar B and therefore the passage of its head and tail ends.

In the solution shown, the bending apparatus 10 also comprises a pulling unit 41 interposed between the feed unit 33 and the drawing unit 46 and configured to facilitate the drawing of the bar B from the introduction element 38 toward the drawing unit 46.

According to a possible solution, the pulling unit 41 is provided, for example, with at least a first roller 42 and at least a second roller 43 between which a bar B can slide. At least one of either the first roller 42 or the second roller 43 can be motorized to pull the bar B.

The pulling unit 41 can be provided, in a variant embodiment, with a sequence of first rollers and a sequence of second rollers between which the bar B slides.

The pulling unit 41 can be positioned downstream of the passage channel 34.

The reciprocal distance between the two rollers 42 and 43 can be varied by means of an actuator 44, for example, or other movement mean, which can be associated with at least one of the two rollers, for example roller 43.

According to other embodiments, not shown, it can be provided that the pulling unit 41 has different conformations which however are intended to determine the controlled feed of a bar.

The bending apparatus 10 can also comprise at least a second position detector 45, for example a laser device, an encoder or suchlike. The function of the second position detector 45 is to detect the passage of the bar B and therefore of its head and tail ends.

The second position detector 45, in the embodiment shown, is positioned immediately upstream of the drawing unit 46, that is, in this case downstream of the pulling unit 41.

The second position detector 45 could also be positioned directly downstream of the passage channel 34.

The distance between the first position detector 40 and the second position detector 45 allows to optimize the bending process of the bars B, reducing waste to a minimum.

The drawing unit 46, located downstream of the feed unit 33, is suitable to define the direction of feed A of the bar B toward the next bending unit 35, or work unit in general.

The drawing unit 46 can comprise, for example, at least one pair of drawing rollers 47, at least one of which is motorized, suitable to allow the translation of the bar B in the direction of feed A toward the bending unit 35.

During the bending process of the bar B, the drawing rollers 47 of the drawing unit 46 can be kept in a fixed position, with a control on the motor, to firmly hold the bar B in position in the direction of feed A.

A cutting device 48 is positioned downstream of the drawing unit 46, such as shears or suchlike, suitable to cut a correct length of bar B, also on the basis of the data received from the two position detectors 40 and 45.

By means of the position detectors 40 and 45, in fact, it is possible to accurately establish the length of the bar B to be cut by means of the cutting device 48 so as to obtain the desired bent piece, for example a stirrup or suchlike of the desired length.

The bending unit 35 comprises a support table 49 which can be translated in a direction orthogonal to the direction of feed A by a corresponding actuator 50.

The bending unit 35 comprises a support disk 51, on which a fixed contrast pin 52 is positioned. A bending pin 53 can rotate, for example in direction R, around the fixed contrast pin 52.

The bar B is then inserted between the bending pin 53 and the fixed contrast pin 52 and, through an appropriately combined movement of rotation of the bending pin 53 and translation of the support table 49, in one direction or the other, in a direction substantially orthogonal to the direction of feed A, it is possible to obtain a bent product starting from the bar B, for example a product with a square, rectangular or other shape, such as for example a stirrup or suchlike.

The various operating units described and shown in the drawings can be controlled and managed by a control unit 54, which coordinates and automates the functioning thereof.

As we said, the bars B can be collected in a bundle F and delivered onto the support plane 11 so that they are scattered and singularized, as for example in FIG. 2 or FIG. 4.

The movement devices 13 will contribute to dispersing the bars B appropriately and move them toward the removal unit 19.

The first gripper 27 of the removal unit 19 is lowered so that the corresponding jaws 28 remove a bar B', see FIG. 4.

At this point the first gripper 27 is lifted, so as to lift the bar B', which will normally have a certain inclination with respect to the longitudinal direction L, see FIG. 5.

The bar B' is also taken into correspondence with the jaws 31 of the second gripper 30, which, once driven, will straighten the bar B' and take it substantially in the direction of feed A, see FIG. 6, in which the bar B' has been lifted and appropriately aligned in the direction of feed A.

The correct positioning of the bar B' in correspondence with the second gripper 30 is guaranteed by the abutment element 55.

The introduction element 38 is positioned in the direction of feed A, so that the bar B' is automatically aligned in the correct direction required by the bending unit 35.

The head end of the bar B', see FIG. 6 again, is located in proximity to the introduction element 38, in particular in proximity to its lead-in part 57, if provided.

In FIG. 7 it can be appreciated how the bar B' is aligned with the pipe 56 of the introduction element 38.

From FIG. 7, moreover, it can be appreciated how, advantageously, the abutment element 20 maintains at least the last bar B situated in contact with it, already aligned with the introduction element 38, in particular with its pipe 56.

Figure 8:
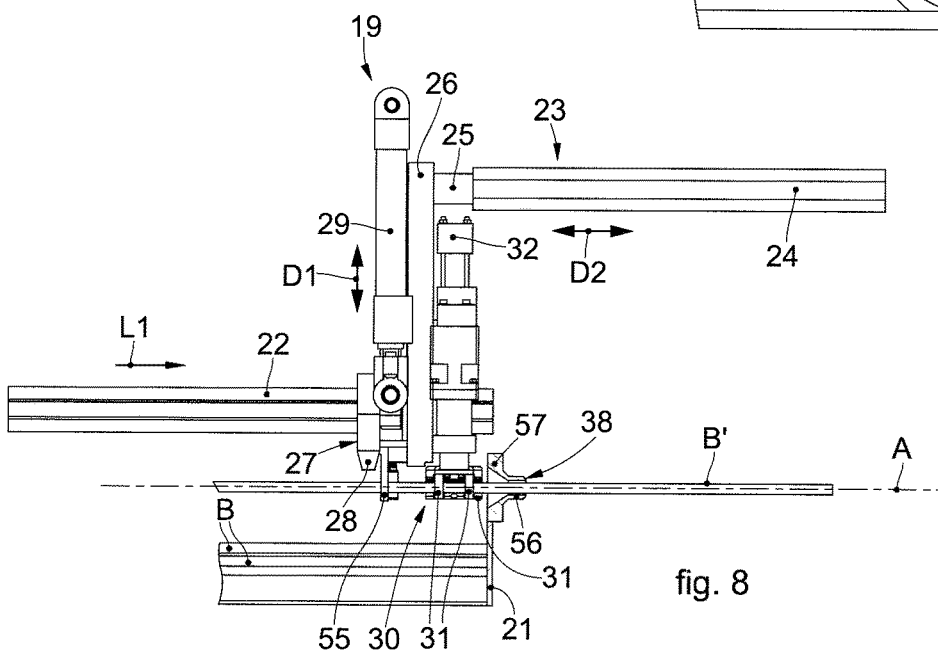
FIG. 8 is a front view of the removal unit during the introduction step of the bar into the introduction element.

To execute the passage of the bar B' through the introduction element 38 and then to position it in the subsequent feed unit 33, the second actuator 23 is driven so as to translate the removal unit 19 in the translation direction L1 along the guide 22, on this point, compare FIGS. 6 and 8.

The translation direction L1 is preferably parallel to the direction of feed A.

At this point at least part of the bar B' is removed from the feed unit 33 which continues its translation in the direction of feed A, for example through the passage channel 34.

From here the bar B' will be taken to the pulling unit 41 and then to the drawing unit 46, from which it will be sent to the bending unit 35, by means of which it will be possible to proceed with the bending step as described previously, that is, by the controlled and combined drive of the support table 49 and bending pin 53 cooperating with the contrast pin 52.

Advantageously, throughout this process, the bar B', removed from the bundle of bars B scattered on the support plane 11, after being picked up by the removal unit 19 is already and automatically in a position aligned with the suitable direction of feed A of the bending unit 35.

The bending apparatus 10, therefore, is able to automatically remove a specific bar B from the support plane 11, to align it with the direction of feed A of the bending unit 35 and therefore to obtain a bent product with the correct size in a precise and effective manner.

As can also be understood, once the bending of a specific bar B has ended, the removal unit 19 can automatically remove a subsequent bar and send it to the bending unit in a precise and automatic manner and in line with the direction of feed A.

Substantially, therefore, the present bending apparatus 10, considering for example the bars B shown in FIG. 2 on the support plane 11, is able to remove, align and bend each of the bars in sequence and automatically, substantially without the manual intervention of any operator, even until the bars B are completely finished from the support plane 11, that is, until the support plane 11 has been completely emptied.

It is clear that modifications and/or additions of parts can be made to the apparatus and method for bending bars as described heretofore, without departing from the field and scope of the present invention.

It is also clear that, although the present invention has been described with reference to some specific examples, a person of skill in the art shall certainly be able to achieve many other equivalent forms of apparatus and method for bending bars, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. An apparatus to feed bars comprising:
a support plane (11) configured to support said bars (B, B') generally oriented in a longitudinal direction;
a removal unit (19) configured to remove at least one of said bars (B, B') from said support plane (11), the removal unit (19) being positioned proximate a longitudinal edge of the support plane (11);
a plurality of movement devices (13) configured to move said bars (B, B') toward the removal unit (19), in a direction transverse to the longitudinal direction;
a plurality of abutment elements (20) fixed along the longitudinal edge of the support plane (11), the abutment elements being configured to keep said bars (B, B') from falling off the longitudinal edge of the support plane (11) and the abutment elements (20) forming an abutment plane intersecting with the removal unit (19), whereby upon abutment of said at least one of said bars (B, B') with the abutment elements (20) said at least one of said bars (B, B') is aligned with the removal unit (19);
a drawing unit (46) configured to draw said at least one of said bars (B,B') in a direction of feed (A) located distanced from said support plane (11);
a work unit (35) to work said at least one of said bars (B, B') located downstream of said drawing unit (46); and
a feed unit (33) interposed between said removal unit (19) and said drawing unit (46), configured to receive said at least one of said bars (B, B') from said removal unit (19) and comprising at least an introduction element (38) aligned with said direction of feed (A) and configured to receive the at least one of said bars (B, B') removed by said removal unit (19), and to put it in line with said direction of feed (A),
wherein said removal unit (19) comprises at least one gripper (27) selectively movable at least in a first direction (D1) incident to the support plane (11) in order to lift said bar (B, B') from said support plane (11) and put it aligned to said direction of feed (A), and in a second direction (D2) parallel to said direction of feed (A) to introduce said bar (B) into said introduction element (38), and in that said feed unit (33) is configured to move said bar (B) in said direction of feed (A) and toward said drawing unit (46).

2. The apparatus of claim 1, wherein it comprises at least a passage channel (34) for said bar (B, B'), positioned between said feed unit (33) and said drawing unit (46) and aligned with said introduction element (38) and with said direction of feed (A).

3. The apparatus of claim 1, wherein it comprises at least a position detector (40; 45) positioned between said introduction element (38) and said drawing unit (46).

4. The apparatus of claim 2, wherein it comprises at least a first position detector (40) located upstream of said passage channel (34) and at least a second position detector (45) located downstream of said passage channel (34).

5. The apparatus of claim 1, wherein said drawing unit (46) comprises at least two opposite drawing rolls (47) between which said direction of feed (A) is defined.

6. The apparatus of claim 1, wherein said removal unit (19) comprises a first actuator (29) connected to said gripper (27) and configured to move at least the latter in said first direction (D1).

7. The apparatus of claim 1, wherein said removal unit (19) comprises a second gripper (30) adjacent to the gripper (27) and configure to straighten and align said bar (B, B') removed by said gripper (27).

8. The apparatus of claim 1, wherein said removal unit (19) comprises at least a second actuator (23) configured to translate at least said gripper (27) in said second direction (D2) in a two-directional manner.

9. The apparatus of claim 1, wherein said support plane (11) comprises a containing wall (21) suitable to head up the bars (B, B') near said introduction element (38).

10. The apparatus of claim 1, wherein said introduction element (38) comprises at least one pipe (56) for the passage of the removed bar (B, B'), said pipe (56) being aligned with said direction of feed (A).

11. The apparatus of claim 10, wherein said pipe (56) of the introduction element (38) comprises a lead-in part (57) suitable to facilitate the insertion of the bar (B, B') removed.

12. The apparatus of claim 1, wherein said work unit is chosen from either a bending unit (35), a shearing unit or a counting unit.

13. A method to feed bars comprising the steps of:
positioning said bars (B, B') on a support plane (11) in a generally longitudinal direction,
moving said bars (B, B') via a plurality of movement devices (13) toward a removal unit (19) in a direction transverse to the longitudinal direction,
removing at least one of said bars (B, B') from said support plane (11) with the removal unit (19), the removal unit (19) being positioned proximate the longitudinal edge of the support plane (11),
drawing said at least one of said bars (B, B') by means of a drawing unit (46) in a direction of feed (A) located distanced from said support plane (11),
working said at least one of said bars (B, B') using a work unit (35) located downstream of said drawing unit (46),
feeding, with a feed unit (33) interposed between said removal unit (19) and said drawing unit (46), said at least one of said bars (B, B') received from said removal unit (19), and
introducing said at least one of said bars (B, B') through at least one introduction element (38) aligned with said direction of feed (A),
wherein:
a plurality of abutment elements (20) are fixed along the longitudinal edge of the support plane (11), the abutment elements being configured to keep said bars (B, B') from falling off the longitudinal edge of the support plane (11) and the abutment elements (20) forming an abutment plane intersecting with the removal unit (19), whereby upon abutment of said at least one of said bars (B, B') with the abutment elements (20) said at least one of said bars (B, B') is aligned with the removal unit (19),
said removing step comprises moving at least one gripper (27) at least in a first direction (D1) incident to the support plane (11) in order to take and lift said bar (B, B') from said support plane (11) and put it aligned to the direction of feed (A), and in a second direction (D2) parallel to the direction of feed (A) in order to introduce said bar (B) into said introduction element (38), and
said feed unit (33) moves said bar (B) in said direction of feed (A) and toward said drawing unit (46).

* * * * *